United States Patent [19]

Greenarch et al.

[11] Patent Number: 5,561,947
[45] Date of Patent: Oct. 8, 1996

[54] CRATE APPARATUS FOR PLANTS, HEDGES AND TREES, AND METHOD OF TRANSPLANTING SAME

[76] Inventors: Robert L. Greenarch, P.O. Box 587; Roger E. Greenarch, P.O. Box 203, both of Hazelwood, N.C. 28738

[21] Appl. No.: 425,750

[22] Filed: Apr. 20, 1995

[51] Int. Cl.⁶ ................................................. A01G 23/04
[52] U.S. Cl. ...................... 47/76; 229/198.2; 217/12 R
[58] Field of Search ............................... 47/76 R, 66 SC; 229/198.2; 217/13, 12 R, 43 R, 45

[56] References Cited

U.S. PATENT DOCUMENTS

| | | | |
|---|---|---|---|
| 1,846,980 | 2/1932 | Singer | 47/76 R |
| 2,072,395 | 3/1937 | Dodson | 47/66 SC |
| 2,261,384 | 11/1941 | Jones | 47/76 R |
| 2,374,390 | 4/1945 | Snyder | 229/198.2 |
| 2,615,589 | 10/1952 | Perdue | 47/66 SC |
| 3,955,320 | 5/1976 | Serovy et al. | 47/66 SC |

FOREIGN PATENT DOCUMENTS

| | | | |
|---|---|---|---|
| 264974 | 8/1912 | Germany | 47/76 R |
| 224569 | 3/1943 | Switzerland | 47/66 SC |
| 1692383 | 11/1991 | U.S.S.R. | 47/66 SC |
| 668757 | 12/1950 | United Kingdom | 47/66 SC |

*Primary Examiner*—Terry L. Melius
*Assistant Examiner*—Joanne C. Downs
*Attorney, Agent, or Firm*—Kerkam, Stowell, Kondracki & Clarke, P.C.; Joseph S. Presta

[57] ABSTRACT

A crate for a plant, hedge or tree, including first and second end members positioned in spaced relation, and first and second side panels extending between the end members. The end members each removably receive and support an end portion of each of the side panels, respectively, wherein the side panels are removably supported in an upwardly diverging relation and define a crate interior therebetween. Preferably, the side panels are slidably received in the end members, in a manner which enables the side panels to be removed from the end members by pulling the side panels in their respective upwardly diverging directions. The crate is designed to carry at least one plant or tree to be transplanted by placing the entire crate in a transplanting hole and pulling the side panels thereof out of the hole, thereby leaving the plant in the hole and enabling the crate to be re-used with another plant or tree. The crate can be used to sell, move and/or transplant an entire hedge section, including a plurality of plants, as a single hedge unit.

18 Claims, 6 Drawing Sheets

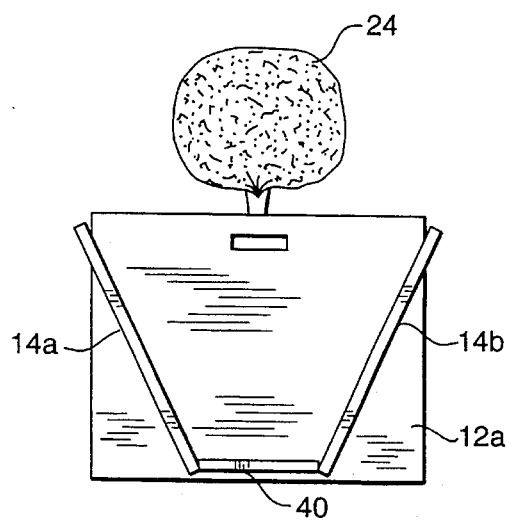
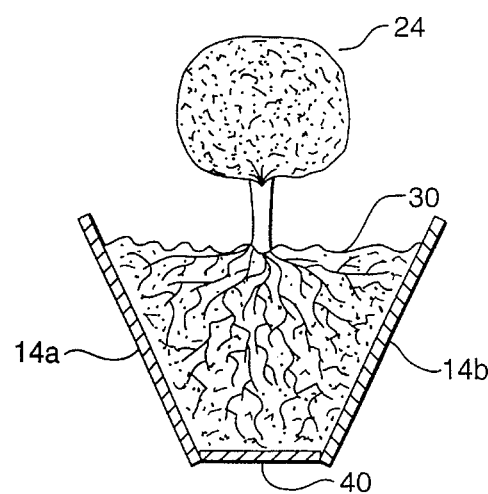
FIG. 8   FIG. 9
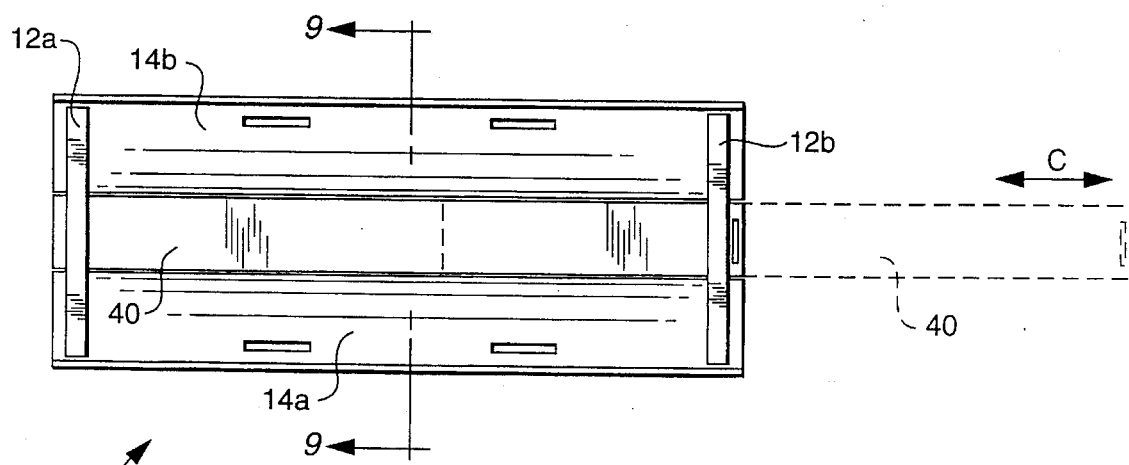
FIG. 10

CRATE APPARATUS FOR PLANTS, HEDGES AND TREES, AND METHOD OF TRANSPLANTING SAME

BACKGROUND OF THE INVENTION

The present invention relates to the fields of horticulture and landscaping, and, more particularly, to an improved crate for use in growing and transplanting plants, hedges and/or trees, and to an improved method of transplanting plants, hedges and/or trees.

Typically, retail and wholesale sellers of plants and trees grow their plants and trees directly in the ground and/or in plant pots which can vary in size in accordance with the size and root system characteristics of the plants or trees. In order to sell a plant or tree which has been grown directly in the ground, the plant is dug-up and placed in a pot which is sold with the plant to the buyer. The buyer must later remove the plant or tree from the pot, either by directly pulling it out of the pot or by turning the pot upside-down and pulling it from the pot, in order to transplant the plant or tree into the ground at a desired location. The action of digging the plant or tree from the ground and the action of pulling the plant from the pot, can injure the root system of the plant or tree and/or cause shock in the plant or tree, either of which can result in death after transplanting.

In particular, serious injury or shock can occur in many plants or trees when the root ball is pulled apart when trying to remove the plant or tree from the pot. In some instances, part of the root ball will be torn off and remain in the pot when the plant is removed therefrom, which results in bare root transplanting of the plant or tree, thereby increasing the likelihood of death once transplanted. This is a particular problem for landscapers or the like who often transplant many plants and trees on a single job by pulling them from pots. Landscapers typically provide a guarantee that a transplanted plant or tree will live for at least a certain period of time. When plants or trees die prematurely as a result of root damage or shock caused by transplanting, it results in considerable expense to the landscaper by having to replace the dead plants or trees. The risk of death is increased when a plant or tree is dug-up or pulled from a pot during the critical dormant growing time of the plant or tree. In fact, many sellers of plants or trees lose sales during the dormant growing times because they cannot dig-up plants or trees during dormant times without a high likelihood that the plant or tree will die as a result thereof.

While known plant pots come in a variety of sizes and shapes, they are only designed to hold a single plant or tree. Thus, if a person wants to form a hedge or the like including a number of similar plants, such as hemlocks, it is necessary to buy numerous separate plants and later transplant the plants in a row to define the hedge. In other words, with known types of plant pots, it is not possible to buy directly from a plant seller a predefined or established plant hedge unit having a plurality of plants therein. It is also not possible with known plant pots to transplant an entire plant hedge including a plurality of individual plants as a single hedge unit.

Thus, a need exists for a method and device for use in growing and transplanting plants and trees, which method and device minimizes shock and disruption to the root system of plants or trees when transplanted. A further need exists for a method and device which enables pre-established hedges or the like to be sold and transplanted as a single hedge unit.

SUMMARY OF THE INVENTION

A primary object of the present invention is to provide an improved crate and method which enables plants, hedges and trees to be transplanted with minimal disruption and shock to the plants, hedges or trees.

A further object of the present invention is to provide an improved crate which enables a pre-established plant hedge to be sold or moved and transplanted as a single hedge unit.

A more specific object of the invention to provide an improved crate which enables the crate to be broken-down or disassembled from around the plant, hedge or tree once placed in a ditch or hole in which one desires to transplant the plant, hedge or tree.

Another object of the invention is to provide an improved crate which enables plants, hedges and trees to be transplanted faster and more efficiently than has heretofore been possible.

Yet another object of the invention is to provide an improved crate for use with plants, hedges and trees, which crate is reusable and can be used, in various sizes, throughout the growing stages thereof.

These and other objects and advantages are achieved by the present invention, which provides a crate for a plant, hedge or tree, including first and second end members positioned in spaced relation, and first and second side panels extending between the end members. The end members each include means for removably receiving and supporting an end portion of each of the side panels, respectively, wherein the side panels are removably supported in an upwardly diverging relation and define a crate interior therebetween.

In accordance with one embodiment, the side panels are slidably received in the end members, in a manner which enables the side panels to be removed from the end members by pulling the side panels in their respective upwardly diverging directions. Preferably, each of the end members includes a pair of upwardly diverging slots therein for slidably receiving the side panels therein, respectively.

In accordance with one embodiment of the present invention, a lower edge portion of each of the side panels converge to define a closed crate bottom which extends substantially between the bottom edge of each of the end members. Preferably, the end members each include handles for enabling the crate to be carried, and the side panels each include handles for enabling them to be pulled upwardly in their respective upwardly diverging directions. The side panels may have a length which enables a plurality of plants to be carried in a single crate. The crates may also include a plurality of plants, such as hemlocks or the like, positioned in linear relation in the crate to provide a pre-assembled hedge unit.

In accordance with another embodiment, a lower edge of each of the side panels converge in a manner which defines an open crate bottom therebetween, and a removable bottom panel is provided to selectively close the open crate bottom.

A preferred embodiment of the method of the present invention includes providing at least one plant in a crate having a pair of removable and upwardly diverging side panels, digging a transplanting hole having a shape which substantially corresponds to the shape of the crate, placing the crate in the hole, and pulling the side panels out of the hole in a manner which leaves the plant in the hole, thereby transplanting the plant from the crate to the hole.

In accordance with another embodiment of the method, the crate includes a removable bottom panel which is removed prior to placing the crate in the hole. The step of providing at least one plant in the crate may include making a hedge in the crate out of a plurality of plants. If a hedge is used, a transplanting hole is made in the form of a trench for receiving the entire hedge.

BRIEF DESCRIPTION OF THE DRAWINGS

Other objects and advantages of the subject invention will become apparent from a study of the following specification when viewed in light of the accompanying drawings, in which:

FIG. 8 shows and end plan view of the assembled crate of FIG. 7 having a plant, hedge or tree therein;

FIG. 9 shows a sectional view of the crate of FIG. 8;

FIG. 10 shows a top view of the assembled crate of FIG. 7; and

DETAILED DESCRIPTION OF THE PREFERRED EMBODIMENTS

Figure 1:
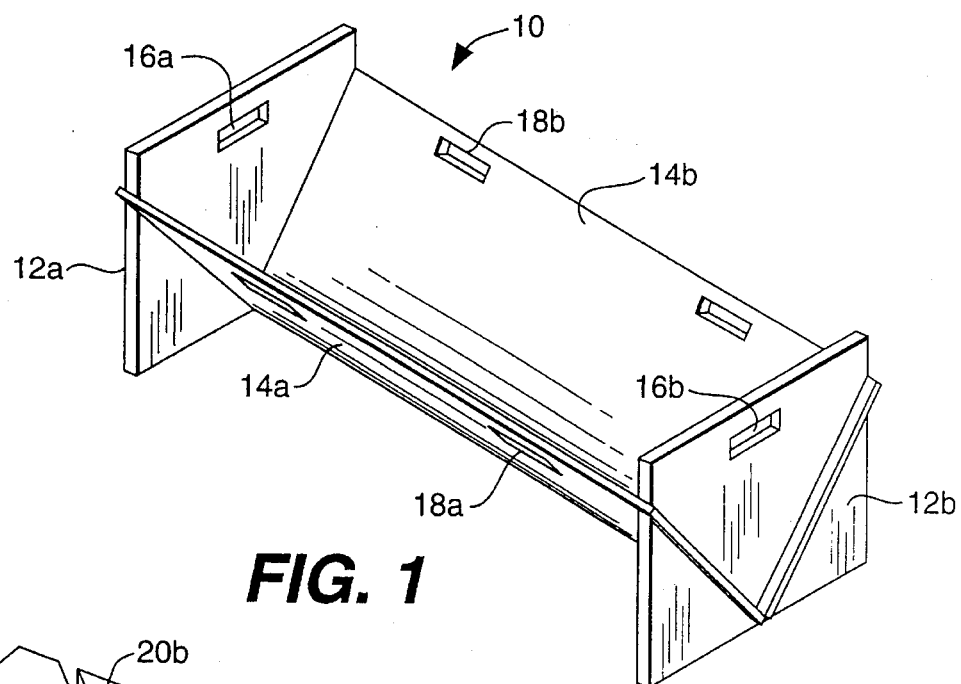
FIG. 1 shows a perspective view of a preferred embodiment of the crate of the instant invention.

Referring now to the drawings, wherein like numerals designate similar parts throughout the various views, and more particularly to FIG. 1 thereof, the crate apparatus 10 of the present invention is particularly suited for use in growing, moving and transplanting plants and trees. The crate 10 includes a pair of end members 12a and 12b constructed to stand vertically in parallel spaced relation. A pair of side panels 14a and 14b are removably received in and supported by the end members 12a and 12b, such that the side panels 14a and 14b have an upwardly diverging relationship which defines a crate interior therebetween. In other words, the end panels 14a and 14b are angled away from each other in the upward direction, thereby defining a substantially V-shaped crate interior for receiving and containing dirt and plants. The end members 12a and 12b operate as supports for the end panels 14a and 14b, as well as stands for the entire crate, which stands support the crate in its upright position shown in FIG. 1. The end members 12a and 12b preferably include handles 16a and 16b for enabling the crate to be carried by one or more persons.

Figure 2:
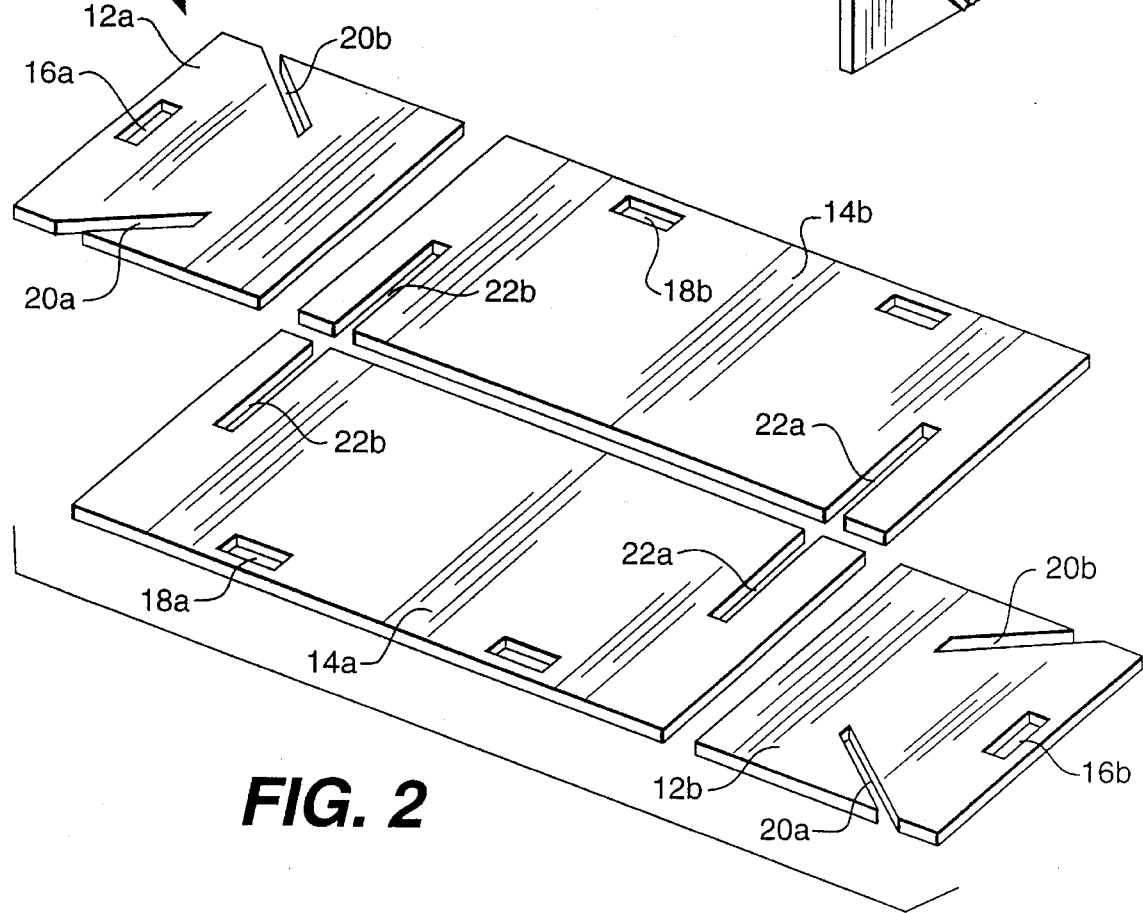
FIG. 2 shows a perspective view of the parts which are used to construct the crate of FIG. 1.

In accordance with an important aspect of the instant invention, the side panels 14a and 14b are removable from the end members 12a and 12b, by pulling the side panels 14a and 14b upwardly in their respective upwardly diverging directions in which they are supported by the end members 12a and 12b. Preferably, each of the side panels 14a and 14b also include one or more handles 18a and 18b for enabling the side panels 14a and 14b to gripped and pulled upwardly in their respective upwardly diverging directions. In accordance with the invention, the crate 10 is constructed or assembled without the use of any fasteners such as nails, screws or the like, thereby enabling the crate 10 to be separated into its constituent parts, as shown in FIG. 2, simply by pulling the side panels 14a and 14b in their respective upwardly diverging directions.

Preferably, each of the end members 12a and 12b include upwardly diverging slots 20a and 20b which are sized and shaped to receive and support end portions of the side panels 14a and 14b, respectively. Preferably, each of the end members 12a and 12b include transverse slots 22a and 22b which cooperate with the diverging slots 20a and 20b to maintain the side panels in their respective positions. For example, the diverging slots 20a and 20b and the transverse slots 22a and 22b may each have a length which is equal to half the width of the side panels 14a and 14b, thereby enabling the side panels 14a and 14b and end member 12a and 12b to be slid together to construct the crate 10 without significantly degrading the structural integrity thereof. The slots may extend from the side edge of the end members, as shown in FIG. 1, or they may extend from the upper edge of the end numbers, depending on the desired width and shape of the crate interior. While the use of the type of slots in the end members and side panels is preferred, any other suitable means for forming slots may be employed which enables the crate to be assembled without the use of permanent fasteners. For example, the end members 12a and 12b may include channels or blocks (not shown) which define slots thereon which support the side panels 14a and 14b. The respective angles of divergence of the side panels 14a and 14b can vary depending on the desired width and depth of the crate 10.

The end members 12a and 12b and the side panels 14a and 14b may be made of any suitable material, which can preferably withstand outdoor environmental conditions and does not rot when placed in contact with dirt or soil. For example, a molded plastic sheet or sheet metal material may be used for the end members 12a and 12b and side panels 14a and 14b, and the handles and slots could simply be cut and/or stamped therein. Preferably, the material used to make the crate has a smooth surface which will prevent roots and/or dirt from sticking thereto. It has been found that end members 12a and 12b and side panels 14a and 14b having sizes which form a crate which is six to eight inches wide, four to six inches deep and four to eight feet in length is ideal for growing seedlings therein. Larger sizes are provided for mature plants. Preferably, the side panels 14a and 14b are strong enough to prevent the sides from bulging outwardly when a root and dirt ball is placed therein. However, to prevent bulging, an additional side panel support member (not shown) similar to the end members 12a and 12b could be positioned intermediate the end members to provide an additional point of support for the side panels 14a and 14b. Alternatively, the bottom edge of one or both of the side panels 14a and 14b could be provided with a connecting device (not shown), such as a slot or a v-shaped ledge, which would enable the bottom edges to be connected together when they converge, thereby helping to prevent any bulging of the side panels. One or more removable wire ties (not shown) or the like which extend between and connect the lower portions of the side panels could also be used to prevent bulging. If wire ties are used they would be snipped off and removed once the crate is in a transplanting hole to enable the side panels to be removed by pulling them upwardly in their respective upwardly diverging directions.

Figure 3:
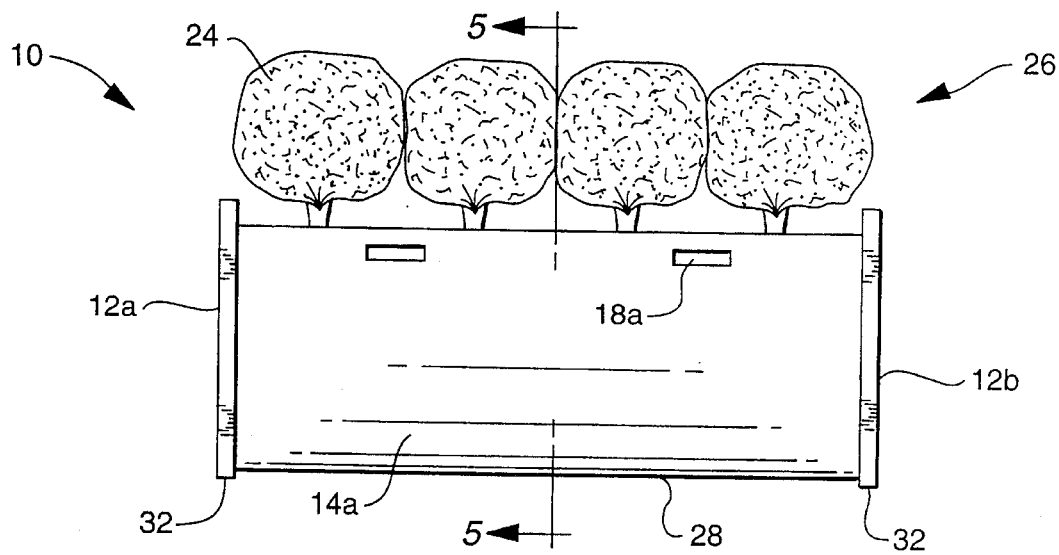
FIG. 3 shows a side plan view of the crate of FIG. 1 having plants therein defining a hedge.

Referring now to FIG. 3, the crate 10 is constructed to receive and contain at least one plant or tree 24 therein, having a root and dirt ball which is supported by the diverging side panels 14a and 14b. The crate may have a length which is suited for containing a single plant or tree 24, or it may be constructed to receive a plurality of plants or trees in substantially linear relation between the end members 12a and 12b. For example, the crate has been found particularly useful in containing a plurality of hedge-type plants, such as hemlocks, which define a pre-established or pre-assembled hedge section therein. Thus, the hedge 26 can be grown as a single hedge unit, trimmed into a desired hedge shape, and moved, sold and transplanted as a single hedge unit. A plurality of other types of non-hedge-type plants or tree could also be provided in the crate to define a pre-established section of plants or tree which can be sold, moved and transplanted as a single unit.

Figure 4:
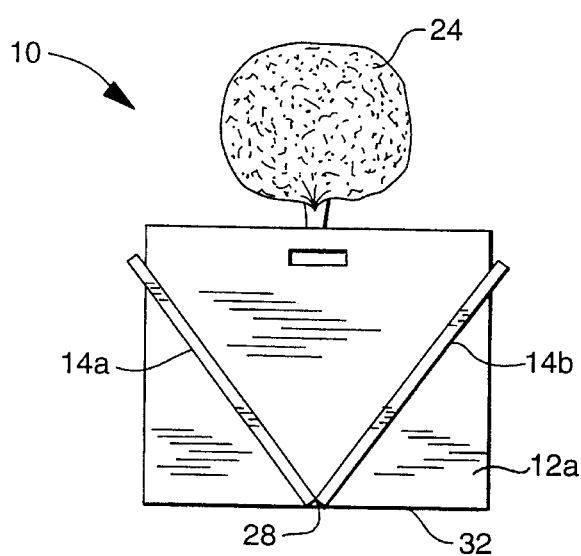
FIG. 4 shows and end plan view of the crate and hedge of FIG. 3.
Figure 5:
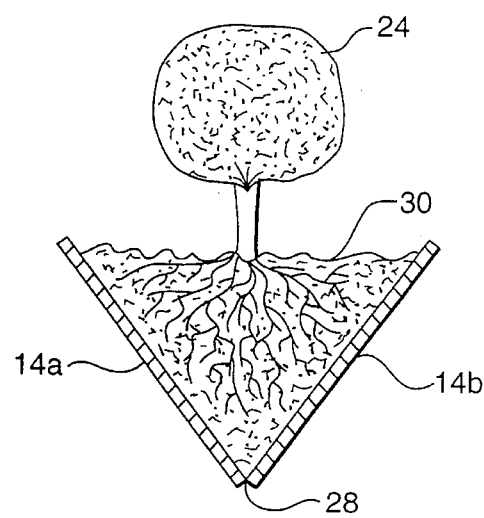
FIGS. 5 shows a sectional view of the crate along line 5—5 of FIG. 3.

Referring now more particularly to FIGS. 4 and 5, in one preferred embodiment of the crate 10, the side panels 14a and 14b include lower edge portions which come together or converge to define a closed crate bottom 28, thereby providing a V-shaped crate 10 which contains the root and dirt ball 30 of the at least one plant 24. The crate 10 is preferably constructed such that the crate bottom 28 is located between the bottom edges 32 of the end members 12a and 12b.

Figure 6A:
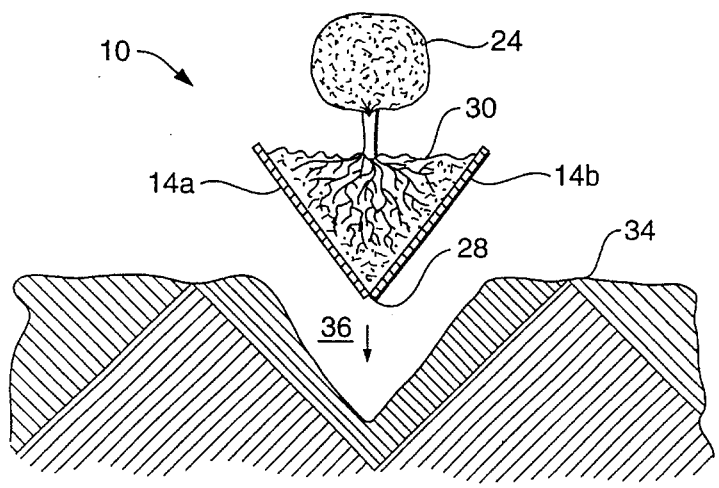
FIG. 6a–6c show a preferred method of transplanting the hedge of FIG. 1 using the crate in accordance with the instant invention.
Figure 6B:
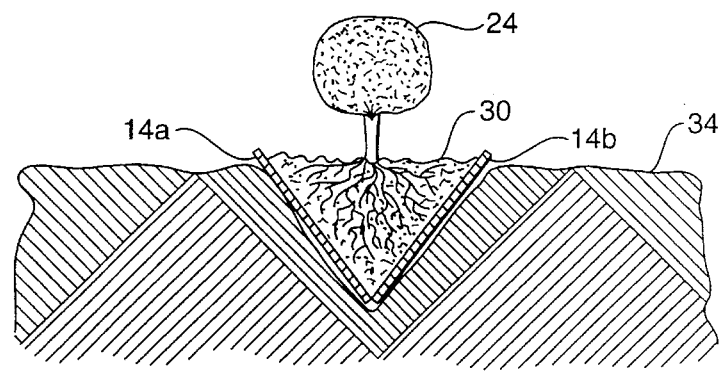
Figure 6C:
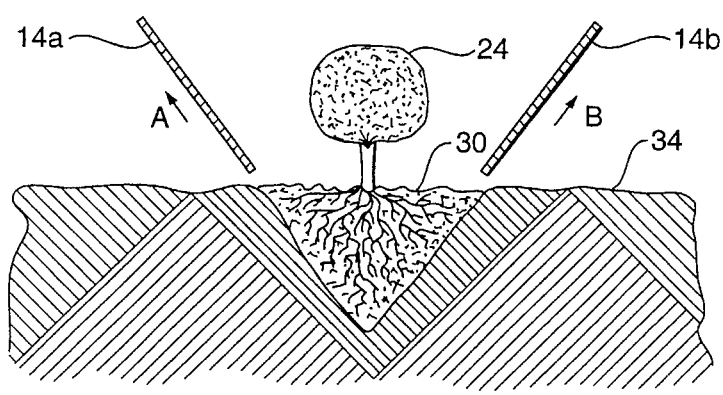

Referring now to FIGS. 6a–6c, the method of the present invention includes digging a hole 36 in the ground 34 or other location in which one desired to transplant the at least one plant or tree 24 contained in the crate 10. The hole 36 is preferably dug in a manner which corresponds to the shape of the crate 10, so that the crate 10, with the at least one plant or tree therein, can be placed in the hole 36, as shown in FIG. 6b, such that the bottom 18 of the crate rests in the bottom of the hole 36 while an upper portion of the side panels 14a and 14b extends slightly out of the hole 36 and the top of the root and dirt ball 30 is adjacent to or slightly above the upper surface of the ground 34. Once the crate 10 is positioned in the hole 36, the side panels 14a and 14b are pulled upwardly in their respective upwardly diverging directions, as indicated by arrows A and B in FIG. 6c, so that the side panels 14a and 14b slide out from between the sides of the hole 36 and the root and dirt ball 30, thereby leaving the at least one plant or tree 24 in the hole 36. It is understood that, while the end members 12a and 12b are not shown in FIGS. 6a–6c, they are also placed in the hole 36 as part of the crate 10, and are also removed therefrom after the side panels 14a and 14b are slipped out. Once removed from the hole 36, the end members 12a and 12b and the side panels 14a and 14b can be reused with other plants or trees.

In view of the non-V-shape of the end members 12a and 12b the hole 36 must be dug-out slightly at locations corresponding to the location of the end member 12a and 12b when placed therein to enable the crate to be fully received in the hole 36. The shape of the end members 12a and 12b may be modified, if desired, to more closely correspond to the shape of the side panels to minimize the extra digging required to make the crate 10 fit in the V-shaped hole 36. However, the relatively square shaped end members 12a and 12b are typically desirable in that they enable the crate 10 to stably stand in its upright position. It is understood that if the crate 10 is elongated, so as to contain a plurality of linearly arranged plants or trees, the hole 36 is provided in the form of a trench for receiving the crate 10. Using this method, the crate 10 is used to transplant either a single plant or tree 24 or a pre-established section of hedge, including a plurality of hedge-type plants, such as hemlocks. A plurality of crates 10, each having a hedge section 26 therein, may be used consecutively or simultaneously in the manner described above to form a continuous section of hedge. For example, six or eight foot long crates 10 could be used and/or sold with six to eight foot sections of hedge 26 therein, to enable a long section of hedge to be formed by transplanting the hedge sections 26 in a long trench in end-to-end relation. Using this method, any length or shape of hedge can be formed using the crates 10 with sections of preestablished hedge 26 therein. Other types of rows of plants of trees could also be formed as a single unit in the manner described above.

Figure 7:
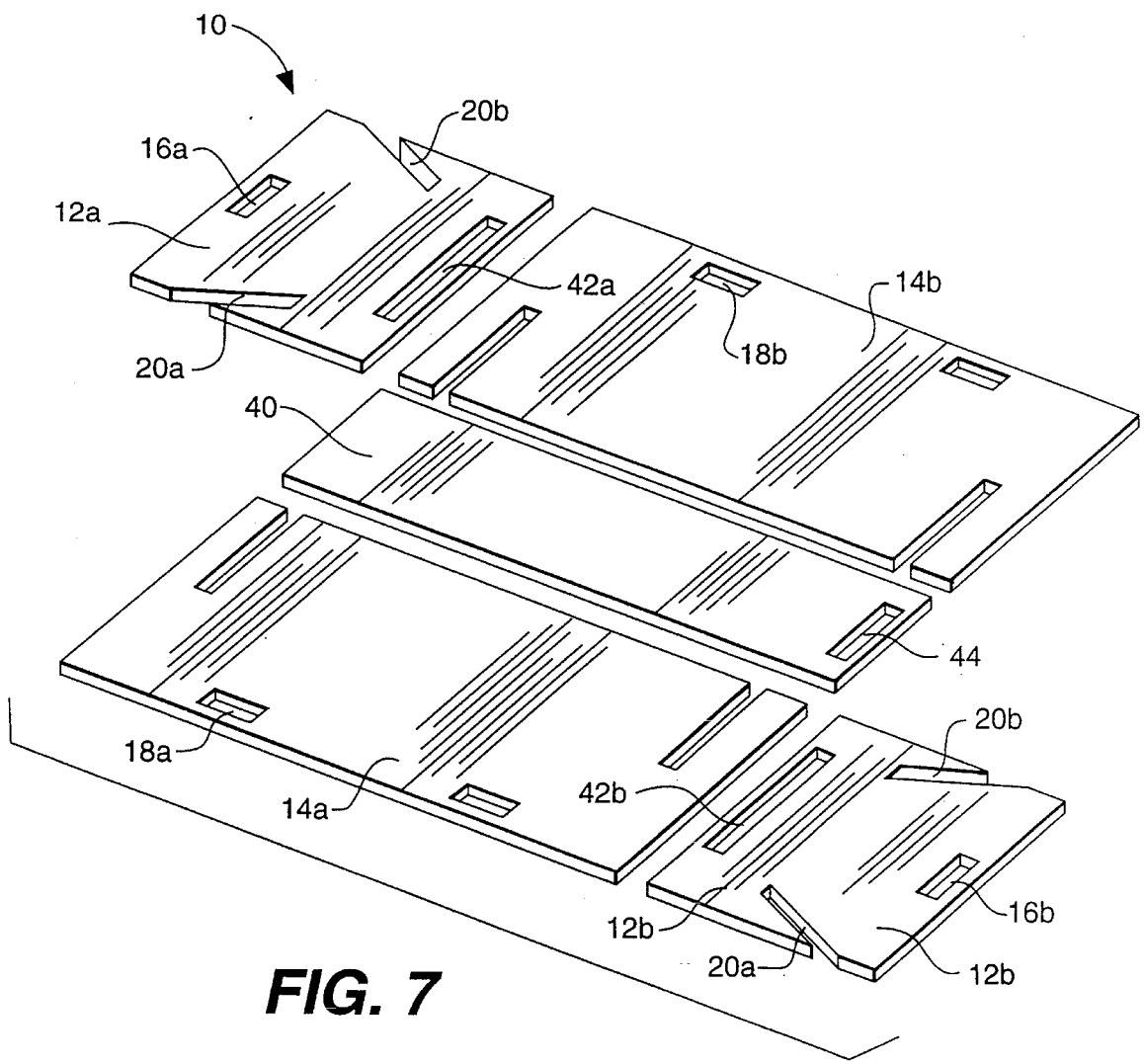
FIG. 7 shows a perspective view of the parts used to construct an alternative embodiment of the crate of the instant invention.

Referring now to FIG. 7, an alternative embodiment of the present is shown which is better suited for use with plants and trees wherein it is desirable not to have a sharp V-shaped root and dirt ball. For example, for when planting certain wide-spread rooted plants or trees in clay soils, the V-shaped hole or trench is sometimes not ideal because it will collect too much water in the bottom of the V and potentially cause the roots to rot. However, the V-shaped crate 10 described above is well suited for dry sandy soils for tap root seedlings and plants, and provides the fastest and easiest method of transplanting in accordance with the instant invention.

The alternative embodiment of the crate 10 shown in FIG. 7 includes similar end members 12a and 12b and side panels 14a and 14b as the crate 10 of FIG. 2, with the addition of a bottom panel 40 which is removably received in the crate 10 and defines a removable flat bottom therefore. Preferably, the end members 12a and 12b include bottom panel slots 42a and 42b for slidably receiving the bottom panel 40 therein, in the manner indicated by the directional arrow C in FIG. 10. The bottom panel 40 may include a handle 44 at one end thereof for enabling the panel 40 to be pulled from the crate 10. The bottom panel 40 may alternatively be constructed to be inserted through side panel slots (not shown) in the side panels 14a and/or 14b rather than through the end members 12a and 12b to form the bottom for the crate 10.

The diverging slots 20a and 20b in the end members 12a and 12b have an angle of divergence which is less than that of the crate shown in FIG. 2, which angle causes the side panels 14a and 14b to define an open bottom crate 10 when assembled. In other words, the bottom edges of the side panels 14a and 14b do not come together when slid onto the end member 12a and 12b, thereby leaving a gap therebetween which results in an open crate bottom. The removable bottom panel 40 is constructed such that, when inserted in the crate 10, it operates to close the otherwise open crate bottom, as shown most clearly in FIGS. 8, 9 and 10.

The bottom panel 40 is inserted in the crate 10 prior to placing one or more plants or trees 24 therein. When the one or more plants or trees 24 are ready to be transplanted from the crate 10, the bottom panel 40 is removed from the crate 10 prior to placing the crate 10, with the plant or tree therein, into a hole or ditch 36 having a shape which substantially corresponds to the shape of the crate 10. Due to the upwardly diverging side panels 14a and 14b, the root and dirt ball 30 will not fall through the bottom of the crate 10 when the bottom panel 40 is removed therefrom. Thus, the crate 10 can be picked-up and moved with the bottom panel 40 removed, without concern that plant or tree 24 will fall through the open bottom thereof.

Figure 11A:
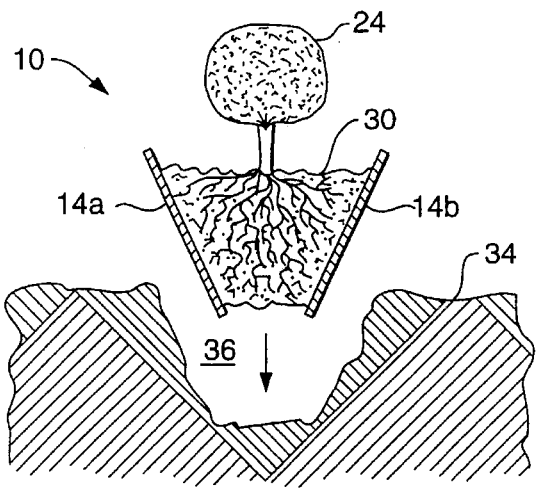
FIGS. 11a–11c show a method of using the crate of FIG. 10 to transplant a plant, hedge or tree.
Figure 11B:
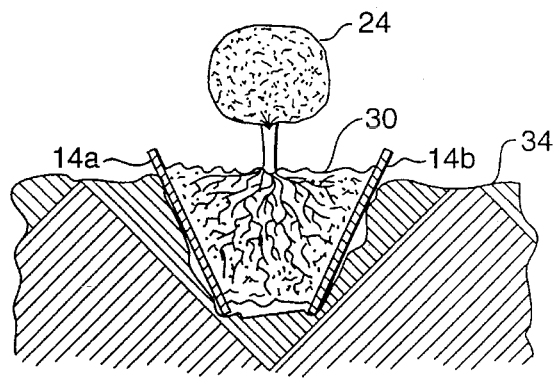
Figure 11C:
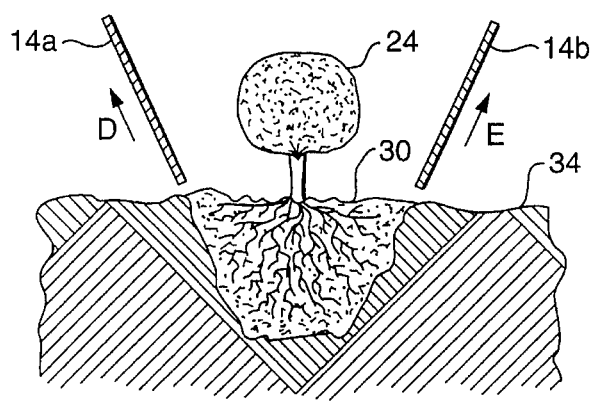

Referring now more particularly to FIGS. 11a–11c, once the bottom panel 40 is removed from the crate 10, the crate 10 is ready to be place in a transplanting hole or ditch 36, as shown in FIG. 11a and 11b. The side panels 14a and 14b are then pulled upwardly out of the hole 36 in their respective upwardly diverging directions, indicated by arrows D and E, thereby transplanting the plant or tree 24 from the crate 10 to the ground 34 without disturbing the root system or causing shock in the plant or tree 24. The crate 10 can then be reassembled for use with another plant or tree. As explained above, the advantage of this embodiment is that the hole or ditch 36 is dug with a more conventional flat bottom shape, which is desirable for some types of plants and trees. This embodiment can be used in the same manner as the V-shaped embodiment described above to grow or transplant a single plant or tree or a plurality of plants or trees in pre-established sections, such as hedge sections.

In accordance with the instant invention, the crate 10 can be made in a variety of sizes and shapes, with and without a bottom panel 40, to simplify the growing, selling and transplanting of plants or trees.

While the preferred forms and embodiments of the invention have been illustrated and described, it will be apparent to those of ordinary skill in the art that various changes and modifications may be made without deviating from the inventive concepts and spirit of the invention as set forth above, and it is intended by the appended claims to define all such concepts which come within the full scope and true spirit of the invention.

What is claimed:

1. Crate apparatus for at least one plant or tree, comprising first and second end members positioned in spaced relation, and first and second separate and individual side panels extending between said first and second end members and defining a crate interior therebetween, said first and second end members each including a pair of upwardly diverging slots for removably supporting an end portion of each of said first and second side panels, respectively, wherein said slots removably support said side panels in an upwardly diverging relation, said slots each including an open upper end for enabling said side panels to be removed from said slots through said open upper ends of said slots, respectively, by pulling said side panels in their respective upwardly diverging directions.

2. A crate apparatus as defined in claim 1, wherein said first and second side panels include transverse slots in each end portion thereof, said transverse slots receiving said end members therein when said side panels are inserted in said diverging slots, respectively.

3. A crate apparatus as defined in claim 1, wherein a lower edge portion of each of said side panels converge to define a closed crate bottom, said closed crate bottom extending substantially between a bottom edge of each of said end members.

4. A crate apparatus as defined in claim 1, wherein said end members each include handles thereon to enable said crate apparatus to be carried.

5. A crate apparatus as defined in claim 4, wherein said side panels include handles for enabling said side panels to be pulled upwardly in their respective upwardly diverging directions.

6. A crate apparatus as defined in claim 1, wherein said side panels include handles for enabling said side panels to be pulled upwardly in their respective upwardly diverging directions.

7. A crate apparatus as defined in claim 1, wherein said side panels have a length which enables a plurality of plants or trees to be received in said crate interior.

8. A crate apparatus as defined in claim 7, further including a plurality of plants or trees positioned in linear relation in said crate interior.

9. A crate apparatus as defined in claim 8, wherein said plants are hedge-type plants which together define a pre-assembled section of hedge.

10. A crate apparatus as defined in claim 1, wherein a lower edge of each of said side panels converge in a manner which defines an open crate bottom therebetween, and further including a removable bottom panel which closes said open crate bottom, said bottom panel being removable by pulling said bottom panel out through an opening in one of said first and second end members while said side panels remain supported in said upwardly diverging relation by said first and second end members.

11. A crate apparatus as defined in claim 10, wherein said removable bottom panel is slidably received in said opening in said end members.

12. A crate as defined in claim 11, wherein said bottom panel has a handle thereon located at one end thereof for enabling said bottom panel to be slid out of said opening in said end members.

13. A crate apparatus as defined in claim 10, wherein said removable bottom panel has a smooth upper surface.

14. A crate apparatus as defined in claim 1, wherein said side panels have a smooth inner surface.

15. A method of transplanting, comprising the steps of:

providing at least one plant in a crate having first and second end members positioned in spaced relation, and first and second separate and individual side panels extending between said first and second end members and defining a crate interior therebetween, said first and second end members each including a pair of upwardly diverging slots for removably supporting an end portion of each of said first and second side panels, respectively wherein said slots removably support said side panels in an upwardly diverging relation, said slots each including an open upper end for enabling said side panels to be removed from said slots through said open upper ends of said slots, respectively, by pulling said side panels in their respective upwardly diverging directions;

digging a transplanting hole having a shape which substantially corresponds to the shape of said crate;

placing said crate in said hole;

pulling said side panels out of said slots and out of said hole in a manner which leaves said plant in said hole;

removing said end members from said hole; and reusing said crate for a different plant.

16. A method as defined in claim 15, wherein said crate includes a removable bottom panel, and said method further includes the step of removing said bottom panel prior to placing said crate in said hole.

17. A method as defined in claim 15, wherein said step of providing at least one plant in said crate includes making a hedge in said crate out of a plurality of plants, and said step of making a transplanting hole includes making a trench for receiving said hedge.

18. A method as defined in claim 15, including the step of growing said at least one plant in said crate until such time as said plant is transplanted.

* * * * *